(12) United States Patent
Pitre

(10) Patent No.: US 10,174,739 B2
(45) Date of Patent: Jan. 8, 2019

(54) FLOATING ENERGY GENERATING PLATFORM WITH HORIZONTAL LIFT

(71) Applicant: Natural Power Concepts, Inc., Honolulu, HI (US)

(72) Inventor: John Pitre, Honolulu, HI (US)

(73) Assignee: NATURAL POWER CONCEPTS, INC., Honolulu, HI (US)

( * ) Notice: Subject to any disclaimer, the term of this patent is extended or adjusted under 35 U.S.C. 154(b) by 0 days.

(21) Appl. No.: 15/590,085

(22) Filed: May 9, 2017

(65) Prior Publication Data

US 2017/0328338 A1 Nov. 16, 2017

Related U.S. Application Data

(60) Provisional application No. 62/333,983, filed on May 10, 2016.

(51) Int. Cl.
*E02B 9/08* (2006.01)
*F03B 13/22* (2006.01)
*F03B 13/10* (2006.01)
*F03B 17/06* (2006.01)
(Continued)

(52) U.S. Cl.
CPC ............... *F03B 13/10* (2013.01); *E02B 9/08* (2013.01); *F03B 13/22* (2013.01); *F03B 17/06* (2013.01); *F03B 17/061* (2013.01); *B63B 2035/4433* (2013.01); *B63B 2035/4466* (2013.01); *F03B 13/14* (2013.01); *F05B 2240/932* (2013.01);
(Continued)

(58) Field of Classification Search
CPC .......... F03B 13/14; F03B 13/16; F03B 13/22; F03B 13/183; F03B 13/1805; F03B 13/1845; Y02E 10/28; Y02E 10/30; Y02E 10/38
See application file for complete search history.

(56) References Cited

U.S. PATENT DOCUMENTS

| 365,133 A | * | 6/1887 | Kessler | ................. | F03D 7/0204 |
| | | | | | 415/7 |
| 1,071,748 A | * | 9/1913 | Ingison | ................. | F03B 17/063 |
| | | | | | 24/570 |

(Continued)

FOREIGN PATENT DOCUMENTS

| CA | 2807876 A1 * | 2/2012 | ............... E02B 9/08 |
| DE | 2921381 A1 * | 12/1980 | .......... F03B 13/1815 |

*Primary Examiner* — Frederick L Lagman
(74) *Attorney, Agent, or Firm* — Polsinelli PC

(57) ABSTRACT

A device for extracting energy from flowing fluid is provided. First and second buoyant lateral side members are provided. A fluid turbine is disposed between and below the lateral side members. At least one support extends from each side member to the turbine. At least one adjustable length support connects to the first and second side members, the at least one adjustable length support being adjustable between a minimum length and a maximum length. When a length of the adjustable length support adjusts toward the minimum length the first and second side members move closer together to thereby lower the turbine relative to the lateral side members. When the length of the at least one adjustable length support adjusts toward the maximum length the first and second side members move away from each other to thereby raise the turbine relative to the lateral side members.

9 Claims, 13 Drawing Sheets

(51) Int. Cl.
*F03B 13/14* (2006.01)
*B63B 35/44* (2006.01)

(52) U.S. Cl.
CPC ....... *F05B 2250/02* (2013.01); *F05B 2250/25* (2013.01)

(56) References Cited

U.S. PATENT DOCUMENTS

| | | | | |
|---|---|---|---|---|
| 1,147,658 | A * | 7/1915 | Stukes | F03B 17/063 |
| | | | | 405/76 |
| 4,210,821 | A * | 7/1980 | Cockerell | F03B 13/20 |
| | | | | 290/53 |
| 5,132,550 | A * | 7/1992 | McCabe | B01D 61/10 |
| | | | | 290/42 |
| 7,105,942 | B2 * | 9/2006 | Henriksen | B63B 35/44 |
| | | | | 290/42 |
| 8,662,792 | B2 * | 3/2014 | Achard | E02D 27/52 |
| | | | | 405/224 |
| 8,866,321 | B2 * | 10/2014 | McCormick | F03B 13/20 |
| | | | | 290/42 |
| 8,956,103 | B2 * | 2/2015 | Gehring | F03B 13/10 |
| | | | | 415/7 |
| 9,702,334 | B2 * | 7/2017 | Murtha, Jr. | F03B 13/20 |
| 2012/0001431 | A1 * | 1/2012 | Smith | F03B 13/1815 |
| | | | | 290/53 |

* cited by examiner

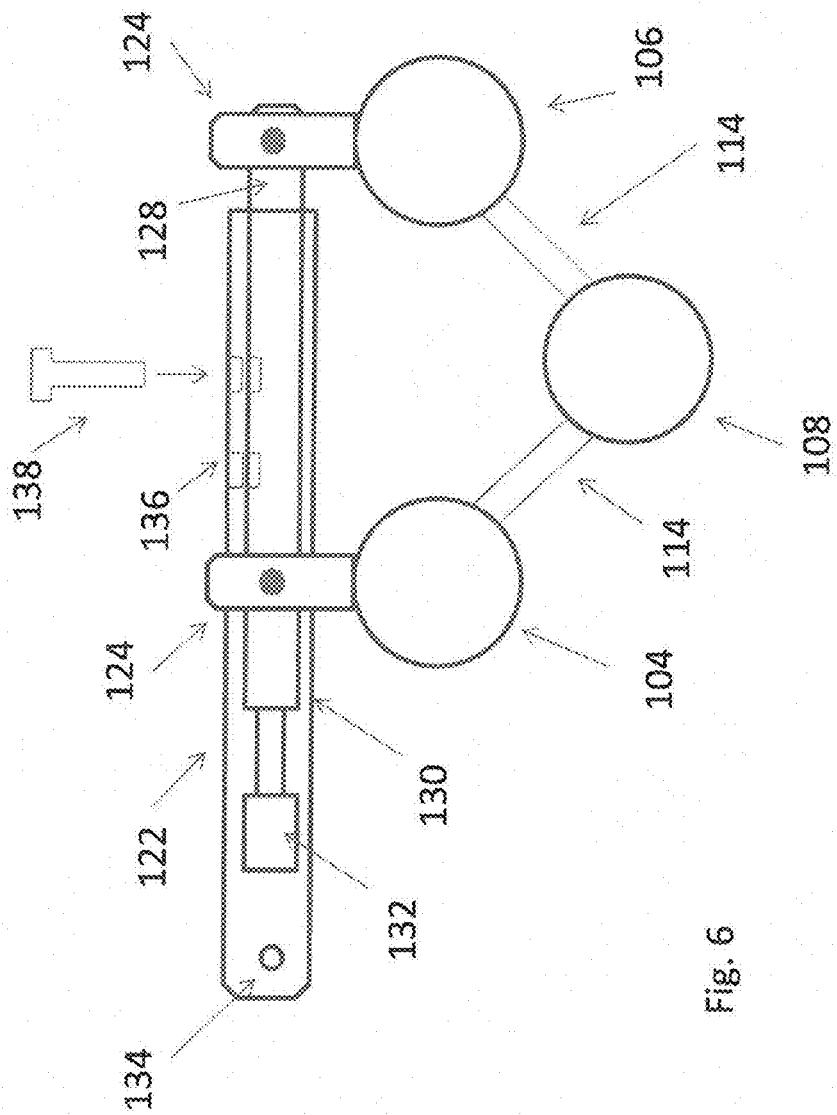

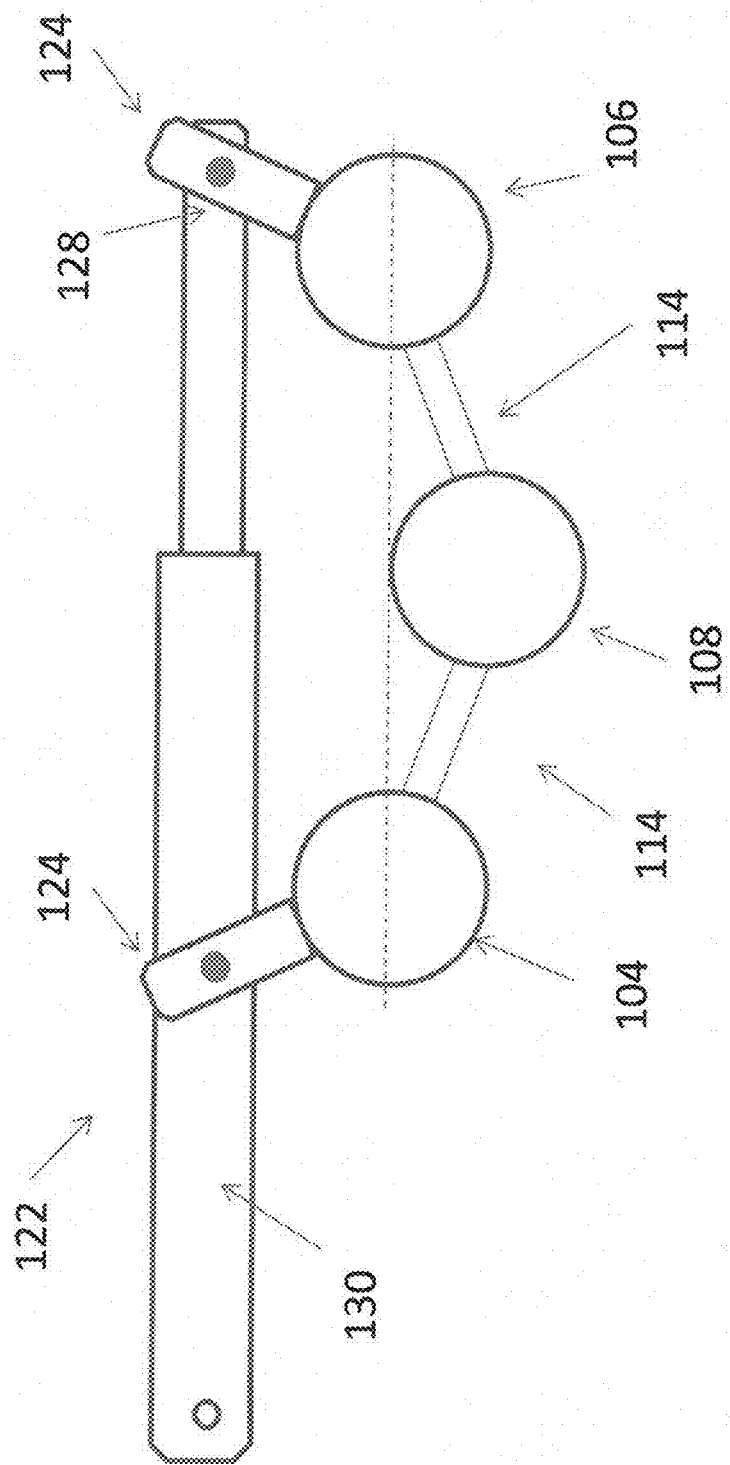

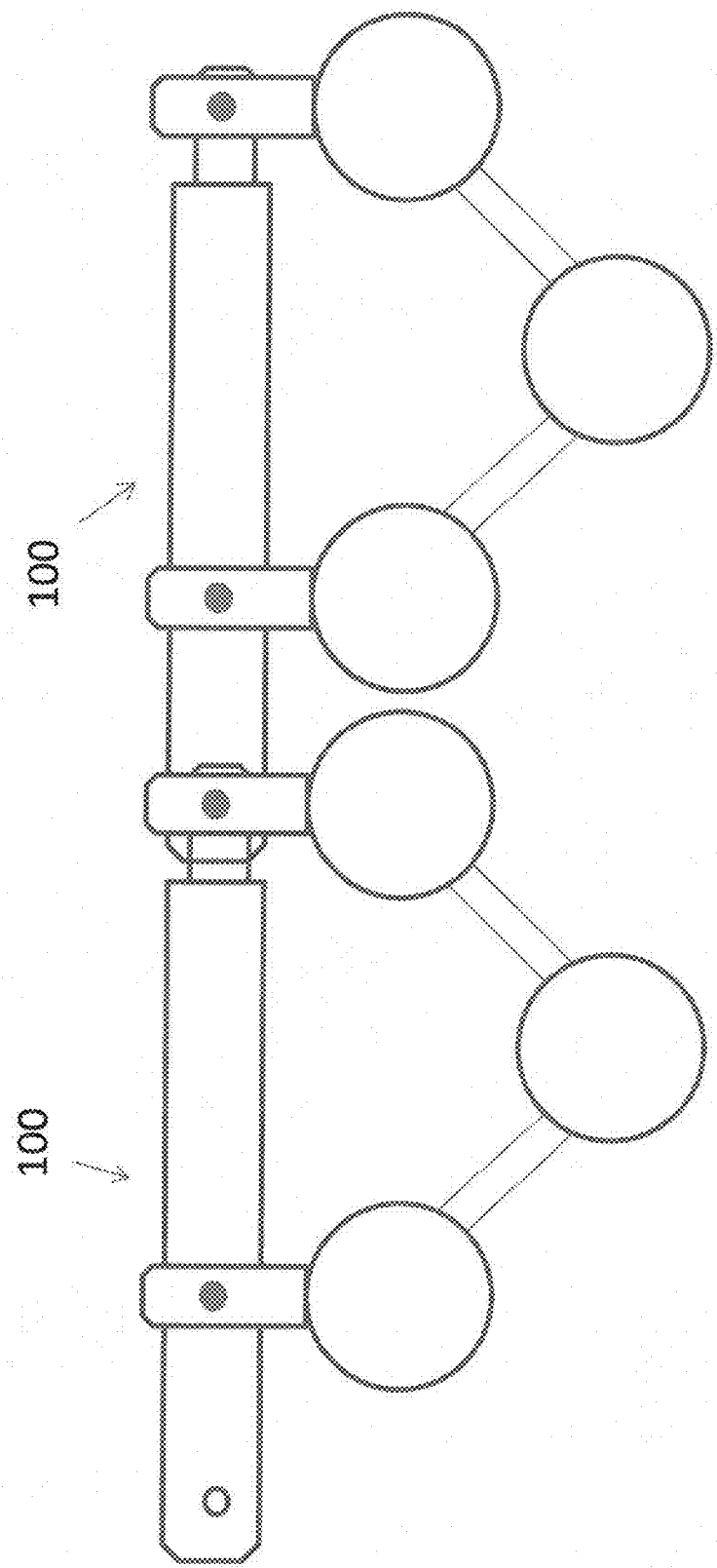

US 10,174,739 B2

FLOATING ENERGY GENERATING PLATFORM WITH HORIZONTAL LIFT

CROSS REFERENCE TO RELATED APPLICATIONS

The instant application claims priority to U.S. Provisional Application 62/333,983 filed May 10, 2016 entitled FLOATING ENERGY GENERATING PLATFORM WITH HORIZONTAL LIFT, the contents of which are expressly incorporated herein by reference in its entirety.

FIELD OF THE INVENTION

The various embodiments described herein relate generally to water energy capture devices. More specifically, the present invention relates to water energy capture devices with adjustable depth.

BACKGROUND

The generation of electricity from water today predominantly uses impoundments, such as dams.

To convert water currents into electricity without impoundments, in-stream energy conversion devices are placed in a flowing stream. According to the Electric Power Research Institute, such in-stream electricity generation without using impoundments remains a largely untapped potential. See, e.g., "North American Ocean Energy Status," Electric Power Research Institute, March 2007. This report states that the world's first marine renewable energy system of significant size to be installed in a genuinely offshore location was the Marine Current Turbine (MCT) 300 kw experimental SeaFlow unit installed off the coast of Devon, UK in May 2003. The MCT SeaFlow unit used a rotating, axial-flow turbine using hydrodynamic, generally planar blades as working members. (The term "working member" here refers to a member having a surface that functions to react with a working fluid, such as water, such that movement of a working fluid causes movement of the working member.) The report discusses other in-stream projects that use axial-flow turbines with generally planar blades. The Verdant Power 5.5 axial flow turbines were installed in the East River of New York beginning in December 2006. The Canadian Race Rocks British Columbia Tidal Project delivered electricity for the first time in December 2006.

U.S. patent application Ser. No. 13/684,723, incorporated by reference herein in its entirety, shows a floating water generation platform in which two buoyant side members support a submerged water turbine. The water turbine may be vertically raised and lowered along a shaft for maintenance and transportation. The overall depth of the platform remains fixed due to the length of the shaft, and the device needed to raise the turbine is complicated.

SUMMARY OF THE INVENTION

It is on occasion desirable to change the depth of a hydro turbine. By way of non-limiting example, greater depth may be preferable for open water environments such as an ocean, while shallower depth maybe preferable for shallower environments such as rivers. Rivers themselves have different depths that may require a different depth of a turbine. Embodiments of the invention thus provide an adjustment methodology to the depth of the turbine so that it may be raised and lowered to function at different depths as called for by the operating environment.

BRIEF DESCRIPTION OF THE DRAWINGS

Various embodiments in accordance with the present disclosure will be described with reference to the drawings, in which:

FIG. 6 illustrates a partial cut away front black box view of a platform according to an embodiment of the invention in a first operational depth.

FIG. 7 illustrates a front black box view of a platform according to an embodiment of the invention in a second operational depth.

FIG. 9 illustrates a front black box view of multiple platforms connected together according to an embodiment of the invention.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like. The term "a" means "one or more" unless the context clearly indicates a single element.

As used herein, the term "front", "rear", "left," "right," "top" and "bottom" or other terms of direction, orientation, and/or relative position are used for explanation and convenience to refer to certain features of this disclosure. However, these terms are not absolute, and should not be construed as limiting this disclosure.

Shapes as described herein are not considered absolute. As is known in the art, surfaces often have waves, protrusions, holes, recess, etc. to provide rigidity, strength and functionality. All recitations of shape herein are to be considered modified by "substantially" regardless of whether expressly stated in the disclosure or claims, and specifically accounts for variations in the art as noted above.

Figure 1:
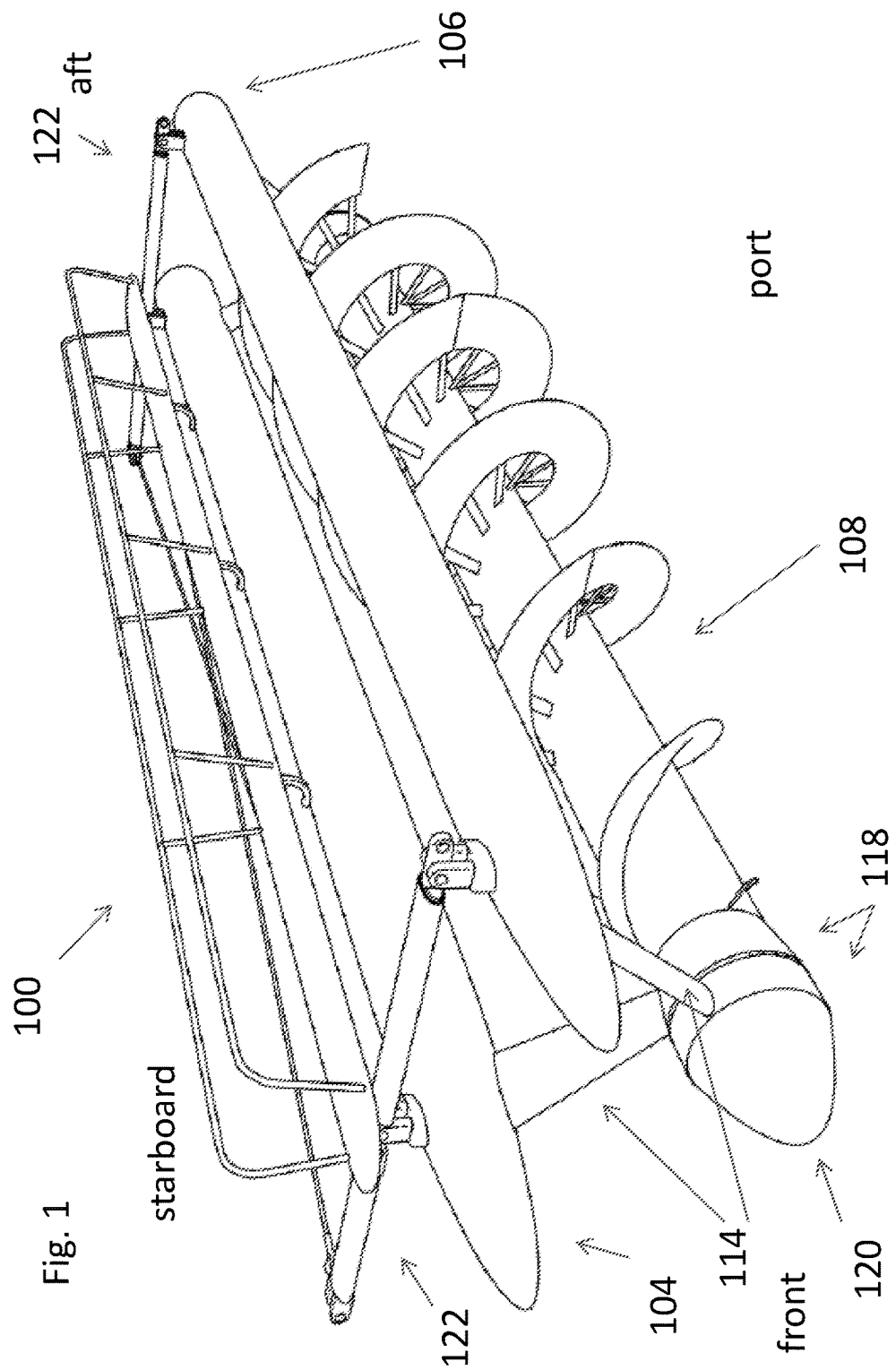
FIG. 1 illustrates a front perspective view of a platform according to an embodiment of the invention configured for a first operational depth.
Figure 3:
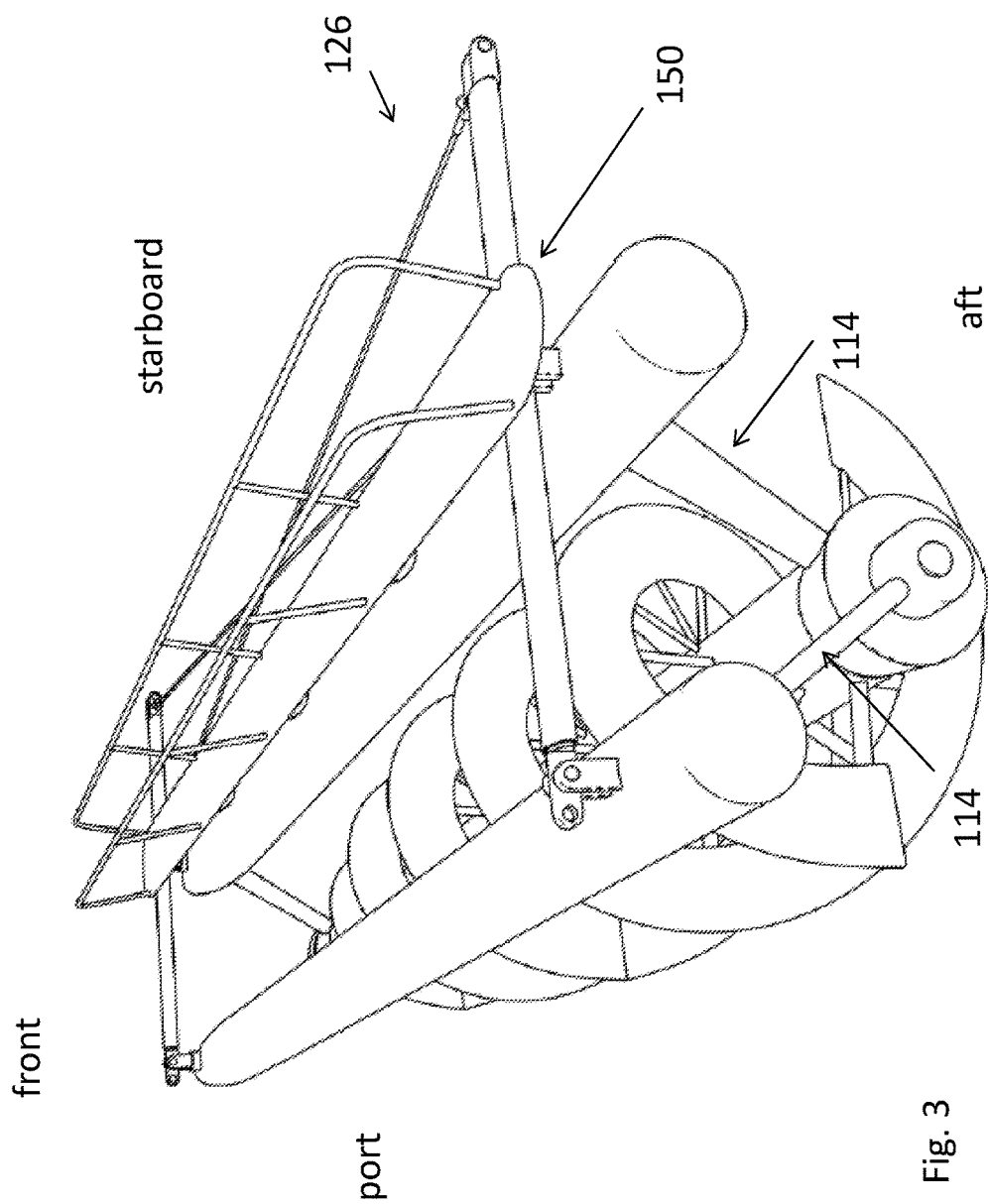
FIG. 3 illustrates a rear perspective view of a platform according to an embodiment of the invention configured for a first operational depth.

FIGS. 1 and 3 illustrates perspective forward and rearward views of an exemplary platform 100 for generating electricity from flowing fluid, such as water (water is referred to herein for simplicity of description, although the invention is not limited to any particular fluid flow). For purposes of description, the end of the platform 100 ending in nose 120 (best seen in FIG. 1) may be referred to as the "forward" end, while the opposite side (best seen in FIG. 3) may be referred to as the "aft" end. As viewed from the aft end looking forward (FIG. 3), the left side of the platform 100 may be referred to as the "port" side, while the right side may be referred to as the "starboard" side.

Platform 100 includes a frame having a starboard longitudinal side member 104 running forward and aft along the starboard side of platform 100 and a port longitudinal side member 106 running forward and aft along the port side of platform 100. Between and below side members 104 and 106 is a hydro turbine 108. Hydro turbine 108 may be any type of water energy extraction device, but is preferably an elongated structure that extends from the fore to aft of platform 100 in parallel with side members 104 and 106. Side members 104 and 106 preferably provide a substantially amount of the buoyancy needed to keep the platform 100 afloat, although additional buoyancy may be provided by other sources, including turbine 108. A walkway 150 may be supported at a variety of points on the platform 100 to support human occupants.

Figure 2:
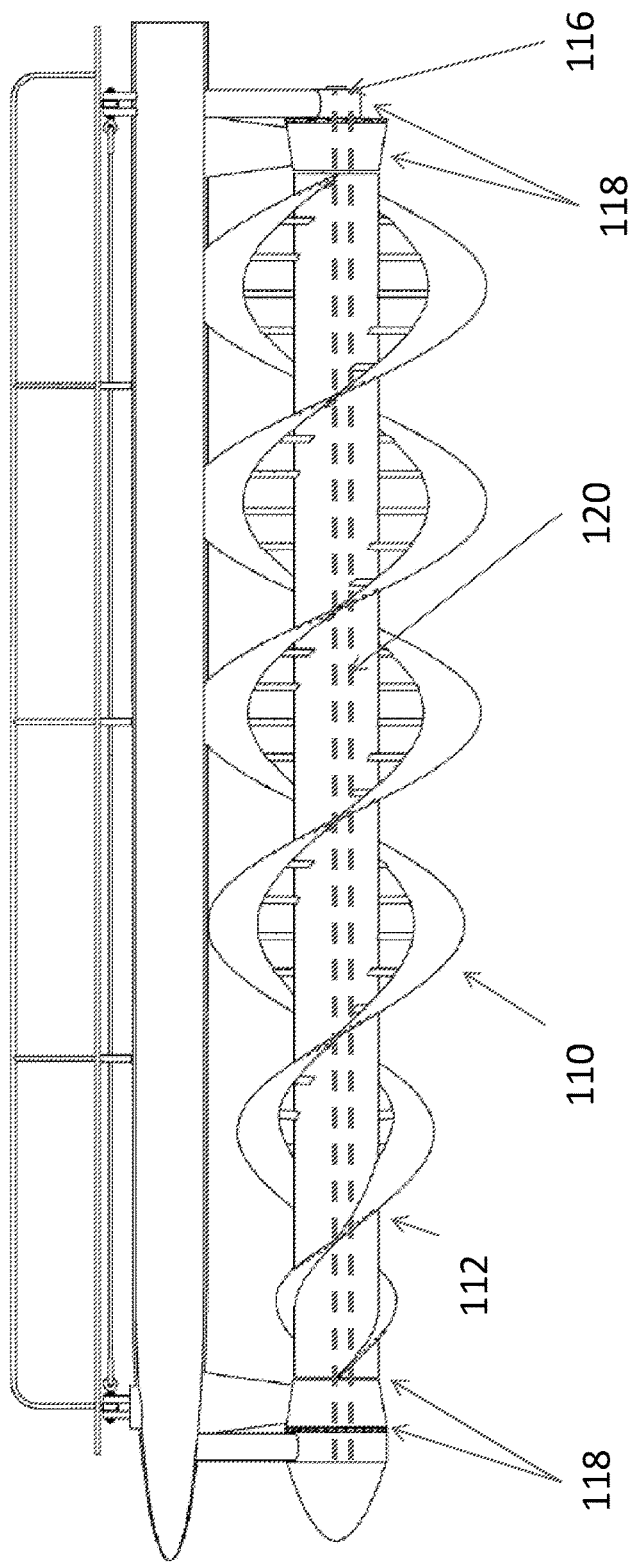
FIG. 2 illustrates a side view of a platform according to an embodiment of the invention configured for a first operational depth.

Referring now to FIG. 2, hydro turbine 108 preferably includes an internal shaft 116 (either part of the turbine and/or a mounting for the turbine 108) as shown in dotted lines, and a working member 110 coiling around a casing 112. The casing 112 provides structural support and some floatation for turbine 108, and the working member 110 engages the water flow to spin turbine 108. The spin of turbine 108 rotates shaft 116, which in turn drives electrical generating components (discussed in more detail below). However, the invention is not so limited, and turbine 108 may not provide any buoyancy.

Turbine 108 preferably has some at least partial prolate characteristics in its structure, akin to the shape of an American football. In the embodiment of FIG. 1, the casing is cylindrical and the outer periphery of the working member 110 generally follows a prolate shape from its nose 120 to an apex of the prolate, before taking on a more cylindrical rearward shape. However, other shapes could be used. For example, the entire outer periphery of working member 110 could be substantially prolate from nose to aft. In another alternative, the casing could itself be substantially prolate. Also, the invention is not limited to prolate shapes.

Side members 104 and 106 preferably provide a substantially majority of the buoyance needed to keep the platform 100 afloat, although some buoyancy may be provided by other sources, including turbine 108 (e.g., to provide buoyancy to make it easier to move in water). The waterline is shown generally at 202.

Figure 4:
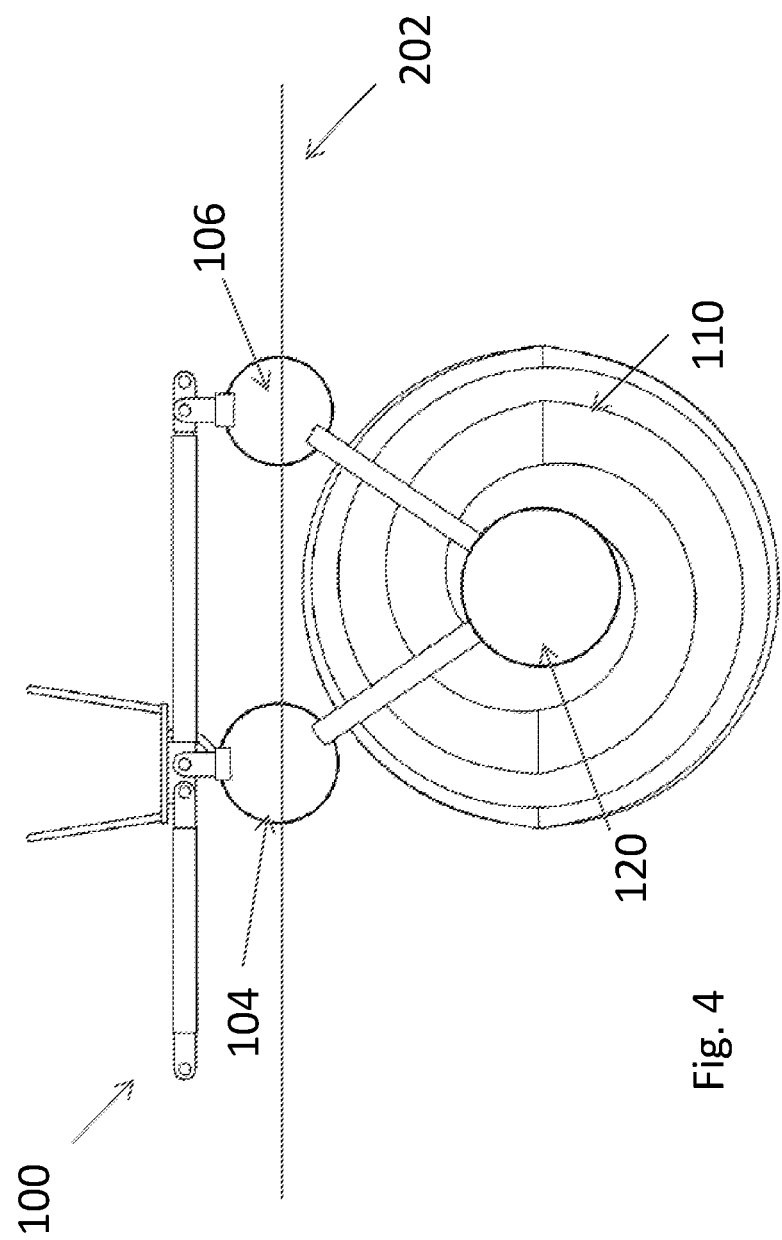
FIG. 4 illustrates a front view of a platform according to an embodiment of the invention configured for a first operational depth.

Referring now to FIGS. 1, 3 and 4, several diagonal supports 114 connect the lateral side members 104 and 106 to turbine 108 to generally define a "V" shape in the front view (FIG. 4). Diagonal supports 114 may be uniform or made from connected components. The connections are preferably direct, but may be indirect through intervening structures.

The bottom (base of the "V" shape) end of diagonal supports 114 connect to annular rings 118 rotatably mounted on shaft 116 or the turbine 108. The upper (top of the "V" shape") end of diagonal supports 114 preferably are integral and/or joined with lateral side members 104 and 106 such that the supports 114 rotate with any rotation of the side members 104 and 106. However, this need not be the case, and flexible connections (e.g., a hinge) may be used.

In the disclosed embodiment, two pairs of adjacent diagonal supports 114 are provided, with one pair at the front of platform 100 (best seen in FIG. 1) and the other pair at the rear (best seen in FIG. 3). Each diagonal support 114 within a pair is preferably adjacent such that their annular rings 118 are adjacent. However, the invention is not limited to this configuration. By way of non-limiting example, additional pairs could also be provided, such as an additional pair proximate to the center of platform. In another non-limiting example, adjacent pairs are not used, for example two diagonal supports 114 connected to the port lateral side member 106 and one central diagonal support 114 connected to the starboard lateral side member 104 (a total of 3 spaced apart supports). In theory, a minimum of two diagonal supports could also be used, although such a design may be less stable compared with the use of additional diagonal supports.

A nose 120 at the forward end caps the forward most end of turbine 108, and has a tapered conical shape to reduce drag and divert debris. A suitable cap or retainer (not shown) is provided at the rear of turbine 108.

Figure 5:
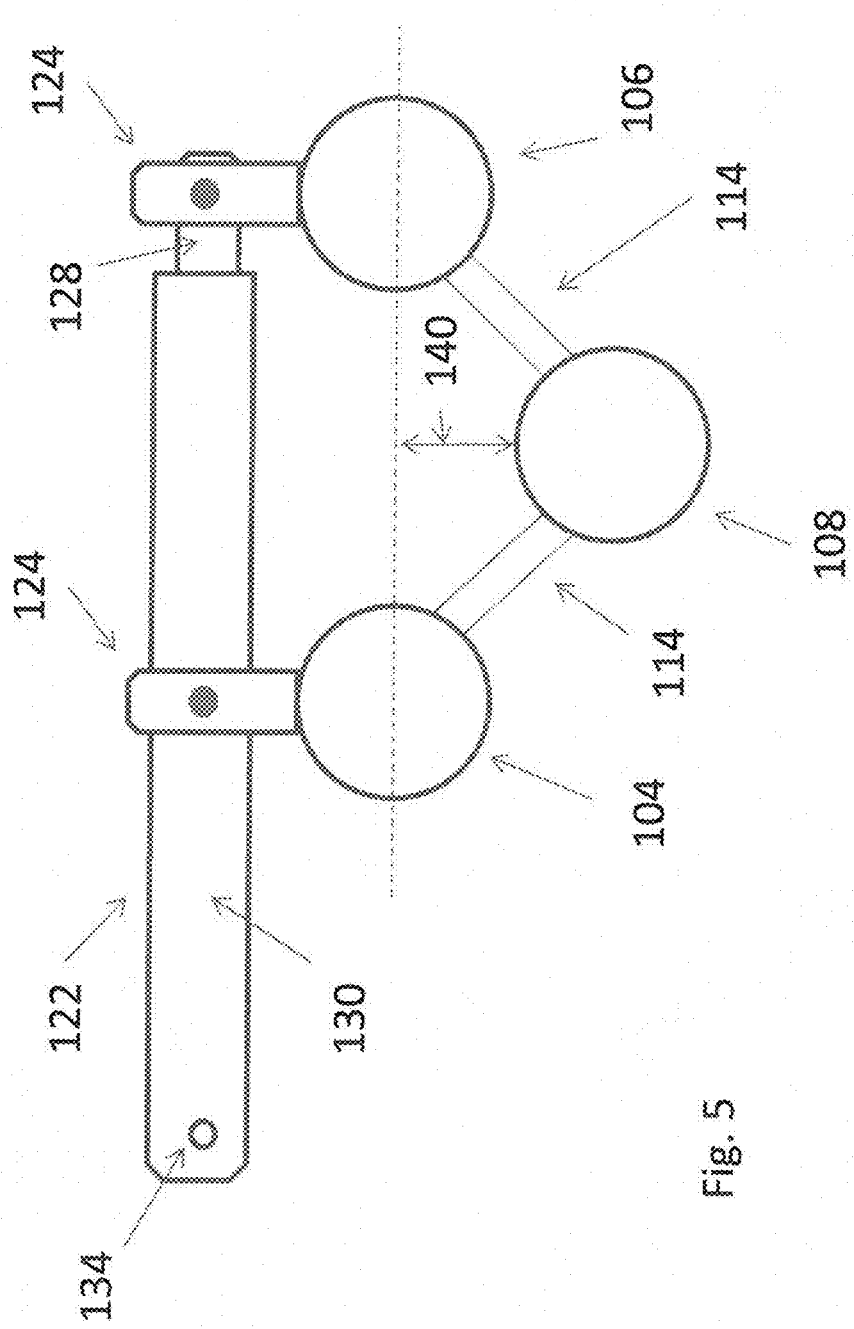
FIG. 5 illustrates a front black box view of a platform according to an embodiment of the invention in a first operational depth.

Referring now to FIG. 5, a block diagram front view of the platform 100 is shown. Dimensions of the component are intentionally not to scale for purposes of illustration. In this embodiment, each lateral support 122 is a telescoping pole containing coaxial sections. Several lateral supports 122 bridge side members 104 and 106 via hinges 124. Two supports are shown, although any number may be used. Cables 126 may connect the lateral supports 122 to provide stiffness. In FIG. 5 the lateral support includes an inner pole 128 within a sleeve 130.

The exposed end of pole 128 rotatably connects to port lateral side member 106 via its hinge 124. A midsection (substantially near center but not necessarily on center, as discussed below) of sleeve 130 connects to starboard lateral side member 104 via its hinge 124; the remainder of sleeve 130 extends outward past starboard lateral side member 104 and ends in a portion of a hinge 134. In another embodiment, this arrangement could be reversed with the end of pole 128 supported on starboard lateral member 104. All lateral side members may be similarly oriented, although this need not be the case (some could extend port-to-starboard while others starboard-to-port).

Referring now to FIG. 6, the interior view of sleeve 130 shows the extension of pole 128 therein. An electromechanical driver 132, such as a piston, may be provided to move pole 128 back and forth in sleeve 130. Driver 132 is not limited to any particular type of movement device, and may be omitted entirely in favor of manual movement.

Sleeve 130 and pole 128 may have multiple holes 136 that align at certain points to receive a locking pin 138 to fix sleeve 130 and pole 128 to prevent further telescopic movement. Other locking mechanisms (including locking movement of the driver 132) may be used to secure sleeve 110 relative to pole 128. The invention is not limited to the manner of extension and/or locking.

Referring now to FIG. 5, when the sleeve 130 and pole 128 are locked together, a fixed orientation is established between the turbine 108 and lateral side members 104 and 106. This fixed orientation establishes a vertical distance 140 between the turbine 108 and a lateral axis of the turbines. When deployed in water such that the side members 104 and 106 float, this sets a basis for the depth of the turbine 108 in the water, as may be further influenced by the specific buoyancy of the later side turbines and/or motion on the water.

When pole 128 is fully retracted into sleeve 130 (subject to stops), this state preferably defines the lowest depth of turbine 108.

Figure 8A:
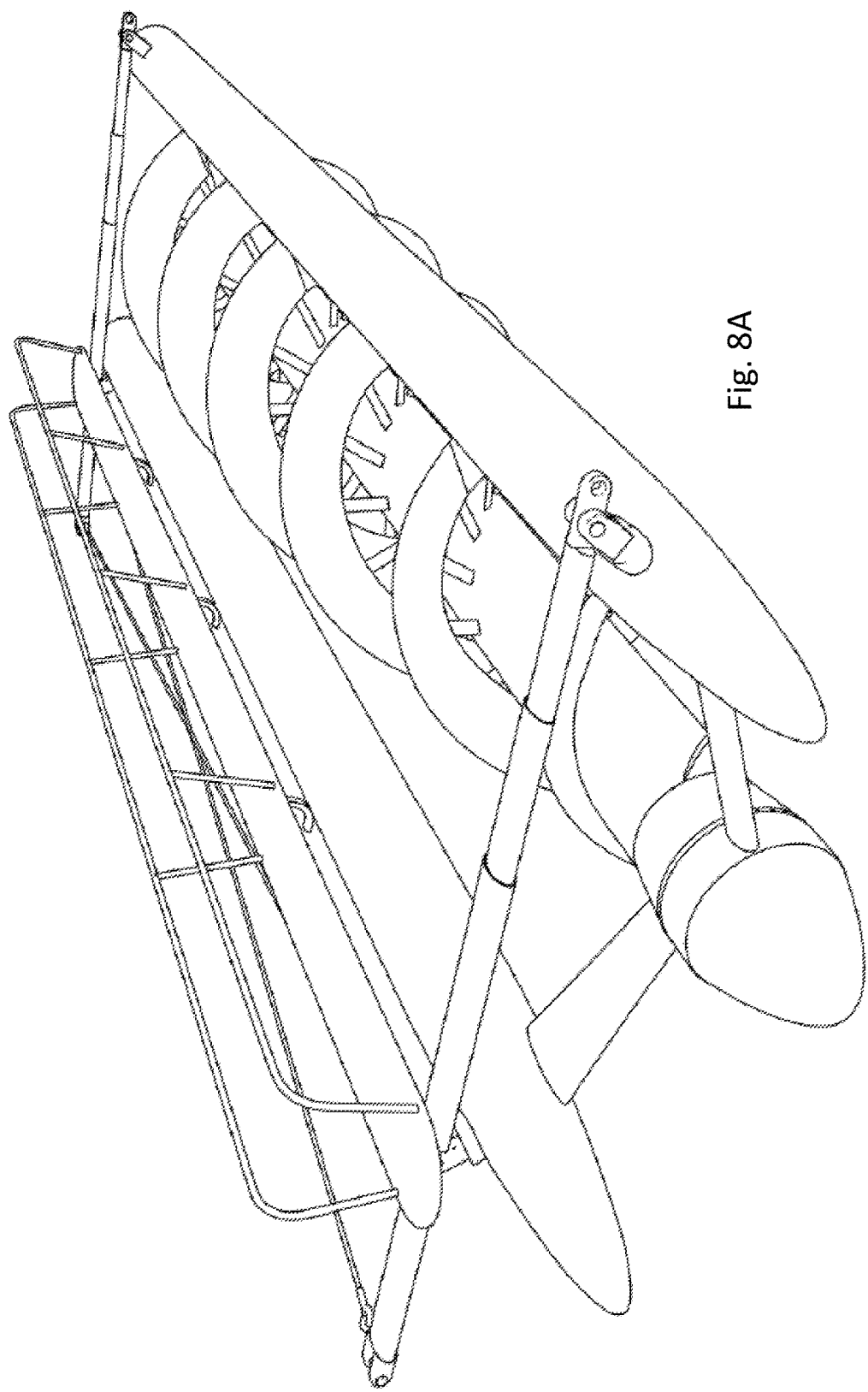
FIGS. 8A and 8B illustrates a perspective and front view of a platform according to an embodiment of the invention configured for a second operational depth.
Figure 8B:
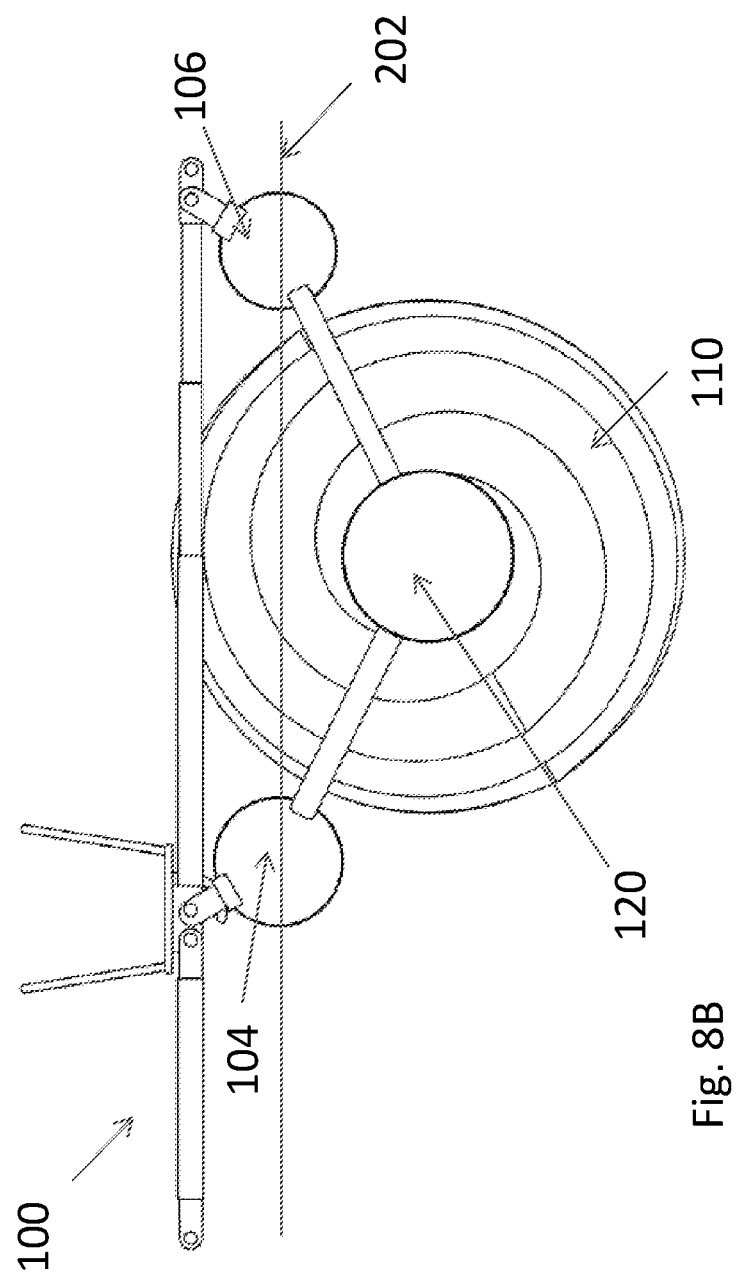

As noted above, different bodies of water, particularly rivers, have different depths that may not accommodate the full-deployed depth of turbine 108. Referring now to FIG. 7, platform 100 can vertically raise turbine 108 by extending pole 128 outward from sleeve 130, either manually or from driver 132. The separation moves lateral side members 104 and 106 apart, and rotates them around their support hinges 124. The separation and corresponding rotation of the lateral side members in turn lifts turbine 108 upward. The change in depth is seen by comparing FIG. 5 relative to FIG. 7. Locking the sleeve 130 and pole 128 at the new position will fix the turbine at its new depth. FIGS. 8A and 8B shows a perspective view of the platform in this lifted state relative to water line 202. Reversing the motion by retracting pole 128 into sleeve 130 bring side members 104 and 106 toward each other, thereby lowering turbine 108.

The above motion may be implemented on land before the platform is moved into the water. In the alternative, the platform may be adjusted while in the water.

Figure 10:
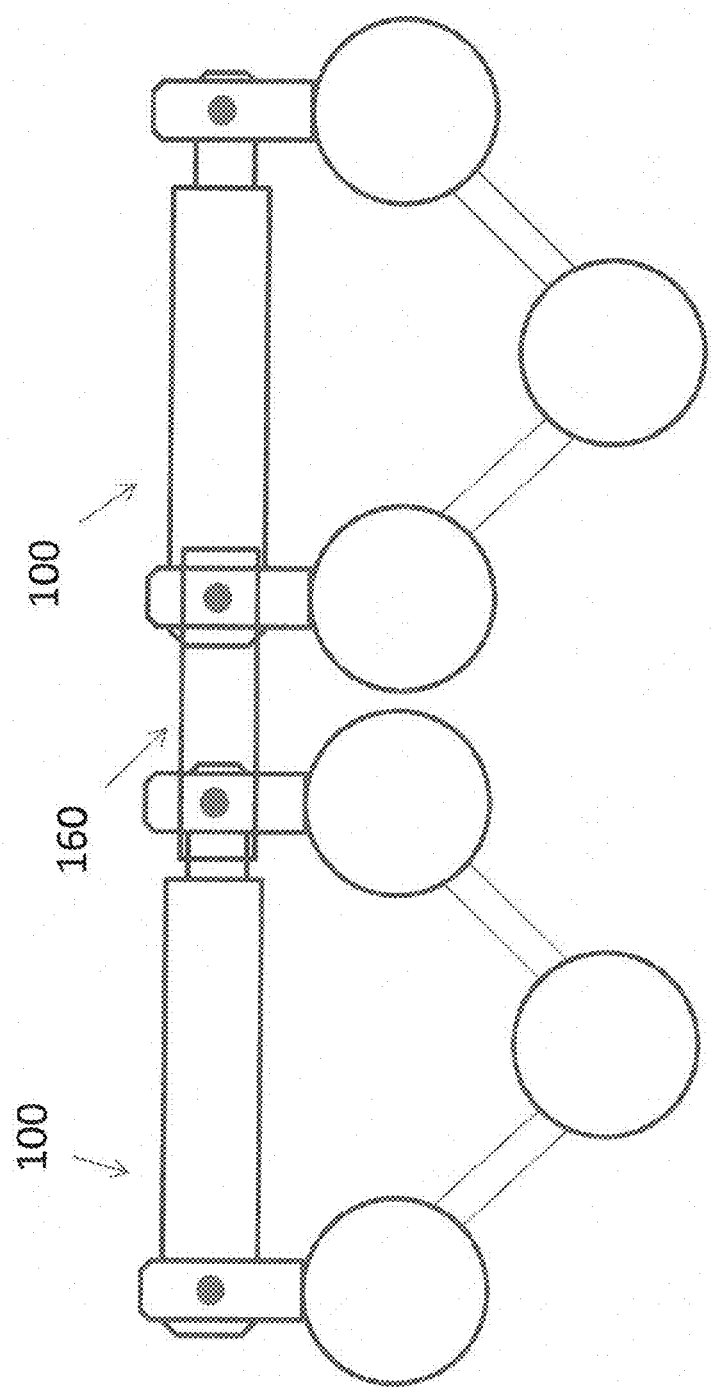
FIG. 10 illustrates a front black box view of multiple platforms connected together according to another embodiment of the invention.

As discussed above, the far end of sleeve 130 has a partial hinge 134. Referring now to FIG. 10, multiple platforms may be connected by linking partial hinge 134 of a first platform 100 to a hinge 124 of a second adjacent platform. This flexible connection will allow the platforms 100 to move up and down relative to each other as may be required to account for waves or water turbulence, but still maintains a minimum distance between adjacent platforms 100. Any desired number of platforms 100 may be so connected with the confines of the dimensions of the body of water.

In the above embodiments, sleeve 130 extends beyond lateral side member 104 to provide the option for connection. However, if no connection is desired, in an alternative embodiment the sleeve 130 can terminate at any desired distance relative to its hinge 124. In yet another alternative embodiment shown in FIG. 10, the additional length of sleeve 130 is replaced with a removable support 160 that has a partial hinge on each end that attaches to hinges 124 of two platforms 100.

Figure 11:
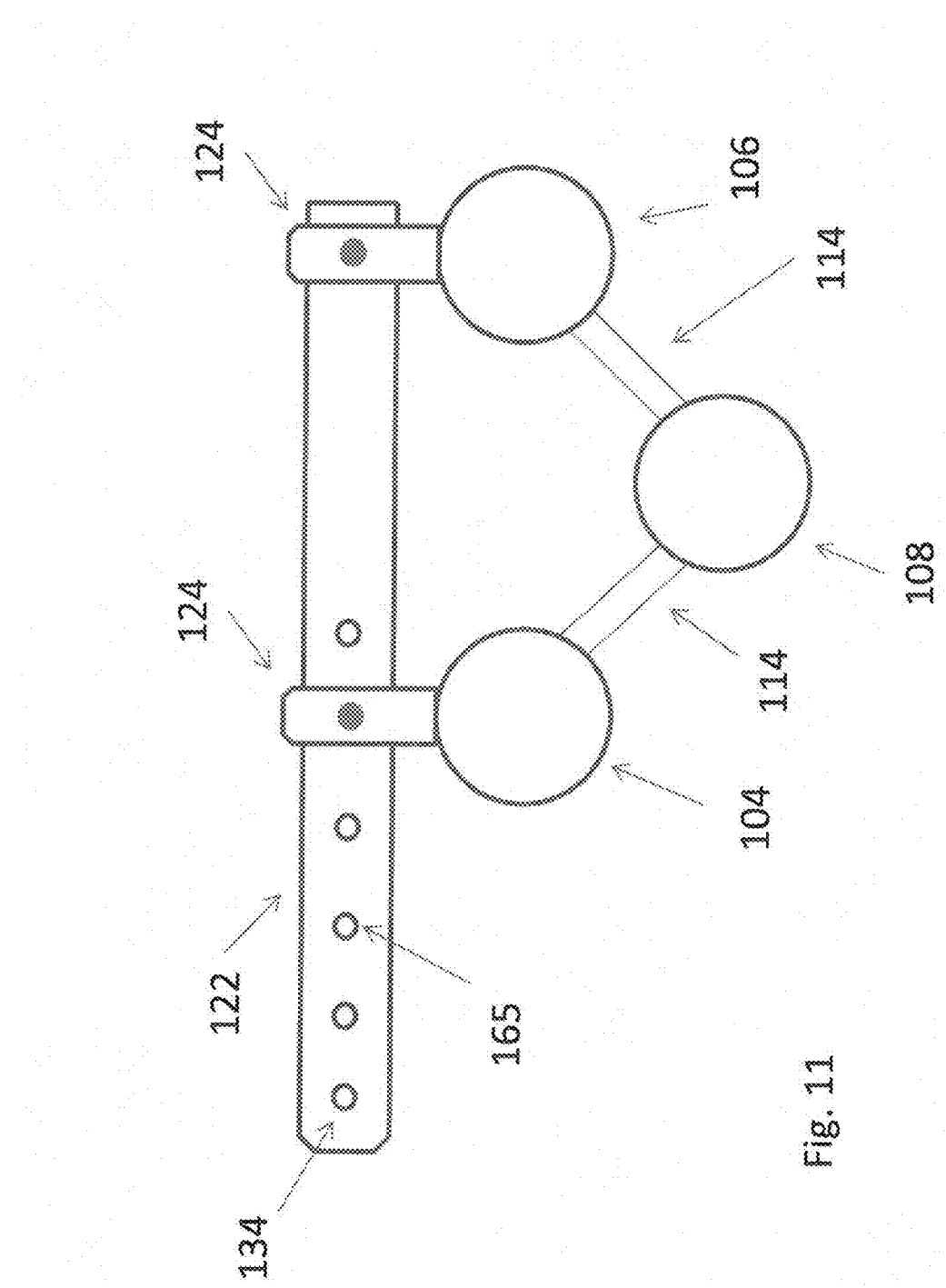
FIG. 11 illustrates a front black box view of a platform according to another embodiment of the invention.
Figure 12:
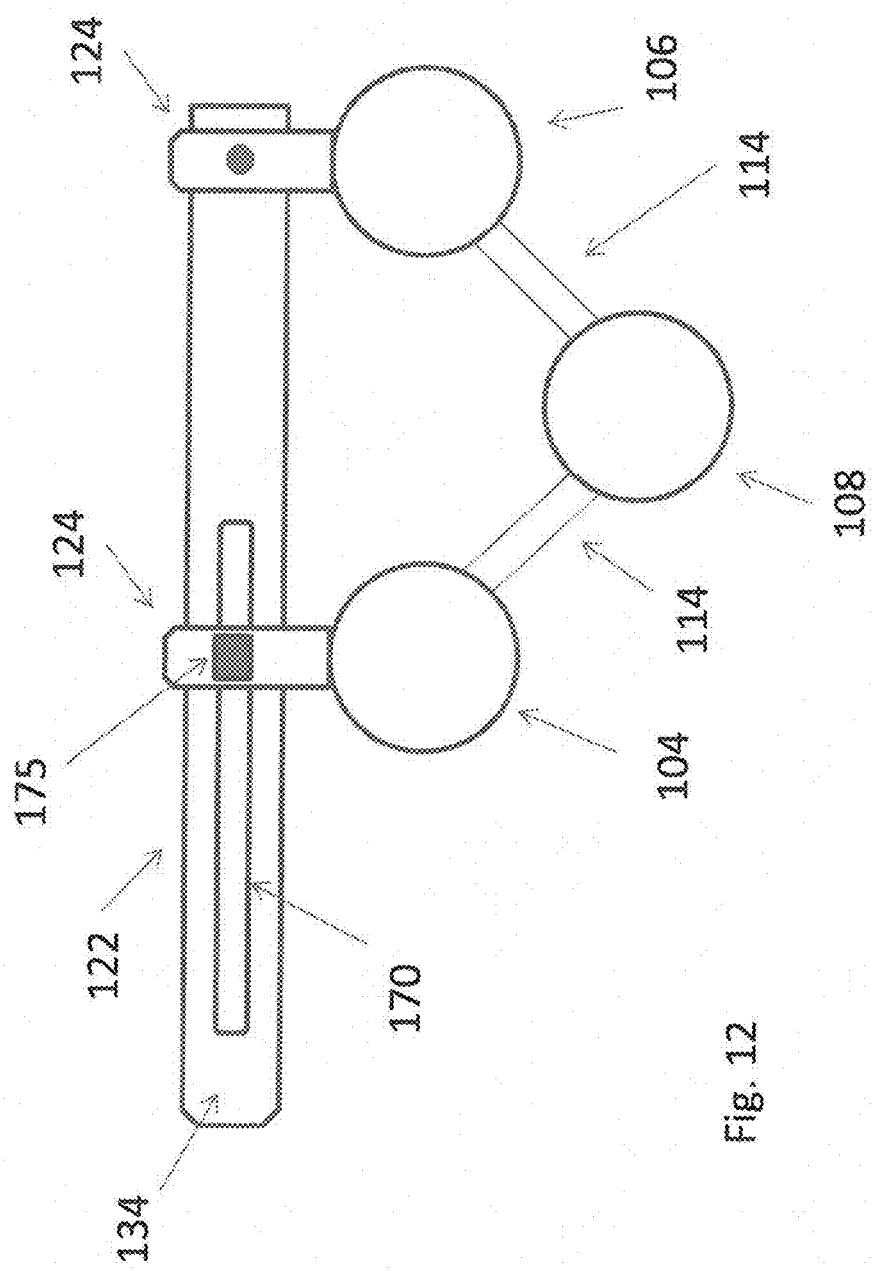
FIG. 12 illustrates a front black box view of a platform according to another embodiment of the invention.

FIGS. 11 and 12 show an alternative embodiment to the use of a sleeve/pole engagement. In FIG. 11, lateral support 122 has multiple hinge points 165 through which the pin of hinge 124 can be inserted to lock the structure in place at the desired shape. In FIG. 12, the lateral support 122 has a groove 170 through which the pin of hinge 124 can slide, and the desired position of side member 104 relative to lateral support 122 is locked by a clamp 175.

Similarly, the end of pole 134 is coincided with its hinge 124. However, the invention is not so limited, and the end of pole may continue past the hinge 124.

The components of platform are made from materials as are known to provide sufficient support for these types of components in this operating environment, e.g., marine grade aluminum, stainless steel, warm marine grade steel. The overall buoyancy of the platform 100 is preferably sufficient to keep the platform 100 at least partially above the water line when the turbine 108 is raised to its highest point.

As noted above, electricity-generating components are driven by this rotation of turbine 108 to generate electricity. Those components may be located within or external to the turbine (such as drive by a gear, shaft and/or chain drive). The details of such electrical generating components are well known in the art of turbines and not discussed further herein. In one embodiment, the generating components may be within one or more of the rings 118, with electrical pathways for the generated energy extending on or internally within diagonal supports 114.

The embodiments herein disclose a lateral support 122 made from a sleeve 130 and pole 128. However, the invention is not so limited, and the lateral support 122 could be a solid component. Adjustment could be, e.g., through a plurality of through holes that can align with hinge 124. Movement could be manual or by a driver 132 (e.g., a motor driving a rack and pinion gear, or a screw jack).

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A device for extracting energy from flowing fluid, comprising:
    first and second buoyant lateral side members;
    a fluid turbine disposed between and below the first and second buoyant lateral side members;
    at least one diagonal support extending from each of the first and second buoyant lateral side members to the turbine; and
    at least one adjustable length support connected to the first and second buoyant lateral side members, the at least one adjustable length support being adjustable between a minimum length and a maximum length;
    wherein when a length of the adjustable length support adjusts toward the minimum length the first and second buoyant lateral side members move closer together to thereby lower the turbine relative to the first and second side members;
    wherein when the length of the at least one adjustable length support adjusts toward the maximum length the first and second side members move away from each other to thereby raise the turbine relative to the first and second buoyant lateral side members.

2. The device of claim 1, further comprising:
    the first buoyant lateral side members including at least one first partial hinge;
    the second buoyant lateral side member include at least one second partial hinge;
    the at least one adjustable length support having first, second and third partial hinges, the first and the third hinges being proximate to ends of the at least one adjustable length support, and the second hinge being at an intermediate point along the at least one adjustable length support;

the at least one of the first partial hinge of the first buoyant lateral side member connecting to the at least one first partial hinge of the at least one adjustable length support;

the at least one of the second partial hinge of the second buoyant lateral side member connecting to the at least one second partial hinge of the at least one adjustable length support;

the at least third hinge extending past the second buoyant lateral side member; and is adapted to connect to a distinct device to form an array of devices.

3. The device of claim 1, wherein the first and second buoyant lateral side members, the fluid turbine, and the at least one diagonal support extending from each of the side members to the turbine define a substantially V shape in a front view of the device.

4. The device of claim 1, wherein the at least one diagonal support has a fixed length.

5. The device of claim 1, wherein the at least one adjustable length support includes first and second coaxial rods which are adapted to move relative to each other to change length of the at least one adjustable length support.

6. A device for extracting energy from flowing fluid, comprising:

first and second buoyant lateral side members;

a fluid turbine disposed between and below the first and second buoyant lateral side members;

at least one diagonal support extending from each of the first and second buoyant lateral side members to the turbine; and at least one horizontal support connected to the first and second buoyant lateral side members;

wherein a connection of the at least one horizontal support to the first and/or second buoyant lateral side members is adjustable to change a distance between the first and second side members;

wherein when a distance between the first and second buoyant lateral side members adjusts toward a minimum length, the first and second buoyant lateral side members move closer together to thereby lower the turbine relative to the first and second buoyant lateral side members;

wherein when a distance between the first and second buoyant lateral side members adjusts toward a maximum length, the first and second buoyant lateral side members move away from each other to thereby raise the turbine relative to the first and second buoyant lateral side members.

7. The device of claim 6, further comprising:

the first buoyant lateral side members including at least one first partial hinge;

the second buoyant lateral side member include at least one second partial hinge;

the at least one horizontal support having first, second and third partial hinges, the first and the third hinges being proximate to ends of the at least one vertical support, and the second hinge being at an intermediate point along the at least one vertical support;

the at least one of the first partial hinge of the first buoyant lateral side member connecting to the at least one first partial hinge of the at least one vertical support;

the at least one of the second partial hinge of the second buoyant lateral side member connecting to the at least one second partial hinge of the at least one vertical support;

the at least third hinge extending past the second buoyant lateral side member; and is adapted to connect to a distinct device to form an array of devices.

8. The device of claim 6, wherein the first and second buoyant lateral side members, the fluid turbine, and the at least one diagonal support extending from each of the side members to the turbine define a substantially V shape in a front view of the device.

9. The device of claim 6, wherein the at least one diagonal support has a fixed length.

* * * * *